O. L. MATHER.
Means for Increasing the Productiveness of Oil-Wells.
No. 214,049. Patented April 8, 1879.
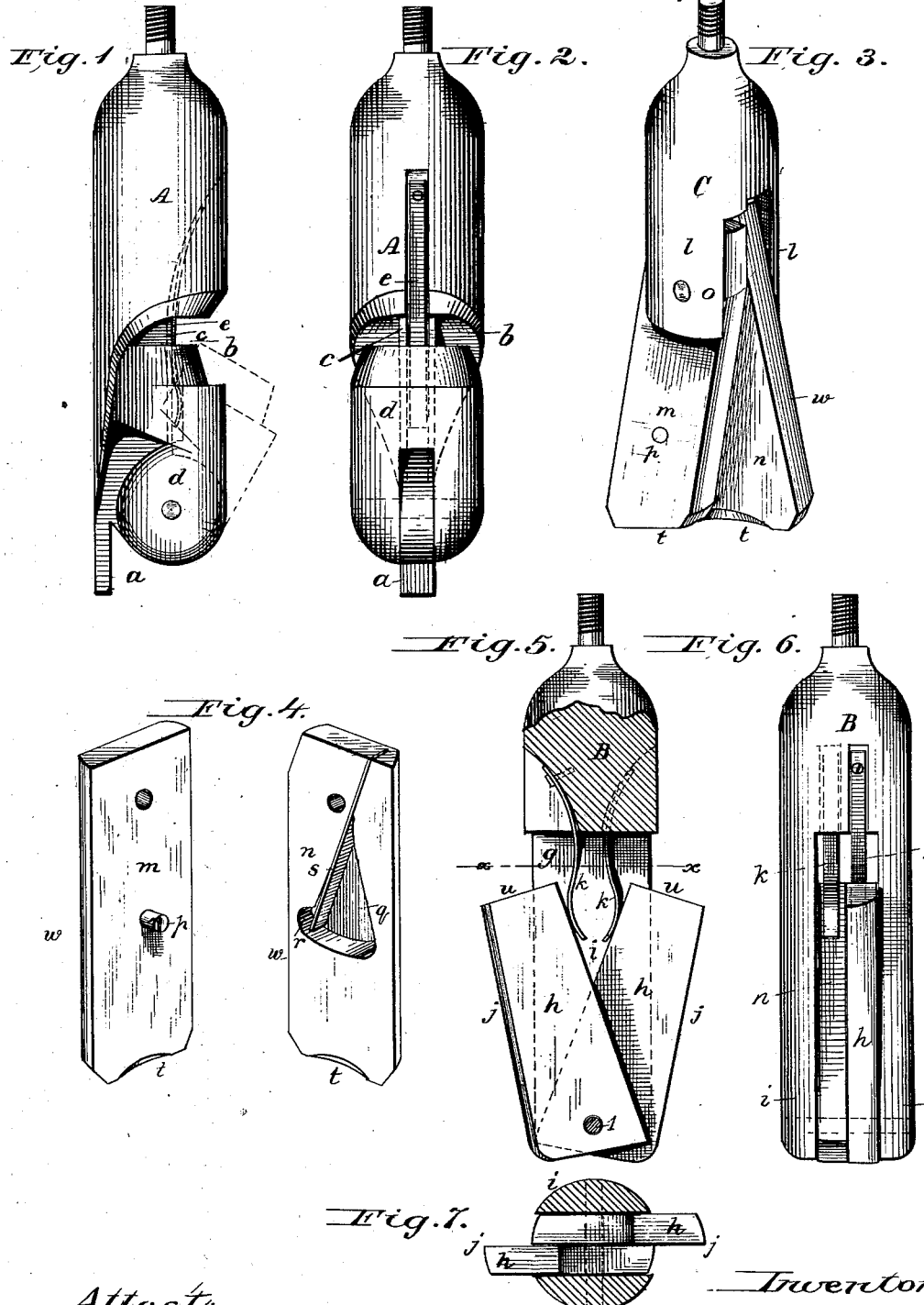

UNITED STATES PATENT OFFICE.

OLIVER L. MATHER, OF WELLSVILLE, NEW YORK.

IMPROVEMENT IN MEANS FOR INCREASING THE PRODUCTIVENESS OF OIL-WELLS.

Specification forming part of Letters Patent No. 214,049, dated April 8, 1879; application filed February 26, 1879.

*To all whom it may concern:*

Be it known that I, OLIVER LYMAN MATHER, of Wellsville, in the county of Allegany, in the State of New York, have invented a certain new and useful Method of Increasing the Productiveness of Oil-Wells, of which the following is a full, clear, and exact description.

In sinking oil-wells, a conductor is driven into the earth until rock is struck, when a drill is inserted, and by repeated blows is driven through the rock until the oil-bearing sand is reached. This sand, usually from thirty to one hundred feet in thickness, is also drilled entirely through, when the oil is brought to the surface by a pumping apparatus, unless there is sufficient gas to cause it to flow.

It is known that the productiveness of oil-wells is impeded by, first, the compacting of the wall by the friction of the drill; and, secondly, by the filling up of the pores of the sand with paraffine and other sediment, preventing the inflow of the oil.

This has been attempted to be remedied by the explosion of torpedoes containing nitroglycerine, but with only partial success.

The desired result I accomplish more thoroughly and perfectly by my invention of mechanically cutting off from the wall and removing from the well all these accumulations, this mechanism cutting either vertically, as in drilling, or laterally by a revolving motion—vertically, by being connected with the ordinary bar, jars, and rope; laterally, by a rotary motion by being attached to a shaft, either solid or cylindrical, and connected at the surface of the earth with the necessary machinery for producing such rotary motion.

In the drawings, forming a part of this specification, Figure 1 is a side elevation, and Fig. 2 a front elevation, of one form of tool for effecting the purposes of my invention. Fig. 3 is a perspective view of another form. Fig. 4 shows, in perspective, the blades, knives, or cutters of the tool shown in Fig. 3 removed from the tool-stock. Fig. 5 is a vertical section with the blades or knives in elevation. Fig. 6 is an edge view, and Fig. 7 is a cross-section on line $x\ x$ of Fig. 5, of another form.

Fig. 1 is used for the special purpose of forming a cavity for the expansion of the blades of the tools shown in Fig. 3 when used for vertical downward cutting, and has no other use, not being required when the tool shown in Fig. 3 is used for cutting by a rotary motion, the latter being adapted and intended for downward cutting by vertical action or by a rotary motion. The tool shown in Fig. 5 is for upward cutting by either rotary or vertical motion.

The several tools employed in carrying out my invention may each be broadly described as a tool composed of a stock to which is attached, in any manner, blades, knives, or cutters of any form, spring-pressed and automatically expanding, with sharp knife-like ends for vertical cutting, and sharp edges to cut laterally by revolving motion, in either manner cutting away the sand of the wall in the oil-bearing stratum to such extent as may be necessary to remove the sediment.

In effecting this the tool A, Figs. 1 and 2, is first inserted in the well. This tool has the stock-point $a$ projecting downwardly sufficiently far to press against the wall of the well, so as to support the tool in an upright position against the pressure of the blade $d$ while cutting.

The lower half of the stock is recessed at $b$. A rib or fin, $c$, extends axially down the stock, and has hinged to its lower end the blade or cutter $d$. The inner face of this blade is recessed, as indicated in broken lines, so as to fit about the fin $c$, and so come within the periphery of the stock. A spring, $e$, is secured at one end to the stock, and having a free end pressing the blade out laterally, and acting when the soft or oil-bearing stratum is reached. The stock has a screw-threaded stem, $f$, to engage with the driving-rod, or for the attachment of a coupler with the rope used to operate it. This tool performs the initial step in my invention. Either of the other tools may be next used; but the upward cutter, Figs. 5, 6, and 7, is preferably employed. This tool B has a recess, $g$, formed in it, so as to leave two walls or side pieces, $i\ i$, between which are secured, by a pin, 1, at the base, two cutters or blades, $h\ h$. These blades are pressed outwardly by springs $k\ k$, secured to the stock in the same manner and acting in the same way as spring $e$. These blades are provided with the longitudinal or side-cutting edges $j$, as fully indicated in Fig. 7, and the top cutting-edges $u\ u$, and the tool acts to cut away the earth from above.

The downward cutter, preferably used to finish the enlargement shown in Figs. 3 and 4, is, like those already described, composed of a stock and blades and a screw-threaded stem for connection with the operating mechanism. The stock is recessed, and has ears or side pieces $l$, between which the blades $m\ n$ are secured. These blades work upon a pin, $o$, passed through the sides $l$. The blades are held together, but separating from each other automatically by a pin, $p$, on blade $m$, that works against a spring, $s$, arranged in a recess, $q\ r$, in the blade $n$. When the tool is at rest the pin $p$ remains in the recess $r$, but when in operation the pressure against the blades tending to move them toward each other causes the pin to travel against the spring through the recess $q$. These blades have the longitudinal cutting-edges $w\ w$ for rotary lateral cutting, and the end edges $t\ t$ for vertical drilling. It will be understood that very stiff springs are necessarily used.

The cutting is effected with my tools by the vertical drilling process, well understood, by the raising and dropping of the tools, or by the rotary process, wherein the sharpened edges $j\ j$ and $w\ w$ of the two tools are made to cut laterally for the enlargement of the well.

By the use of my tools I am enabled to mechanically remove from the walls of oil-wells such quantities of sand as may be necessary to increase the diameter of the well, and by so doing remove the sediment and paraffine, and leave the walls loose and free for the inflow of oil.

In blasting rocks, drills have been employed having expanding bits or cutters to enlarge the bore, so as to obtain a large powder-cavity. I do not broadly claim such drills.

A tool composed of adjustable or expansible spring-scrapers attached to a central rod has been designed and patented for use in scraping off paraffine from the walls of oil-wells; but such tool is incapable of rotary or other drilling action, because the construction and arrangement of its scrapers are such as not to be able to withstand the strain of such action; and, further, because when the scrapers enter a natural crevice in the walls of the wells they become inoperative and must be withdrawn before proceeding with the work of the tool. Such tools form no part of my invention, and differ in their action from my mode of procedure in that they do not enlarge the bore of the wells in the oil-bearing strata, and if they do enlarge it at all the enlargement must necessarily extend from top to bottom of the wells, which would be impracticable in an economic sense and utterly useless; but no such intention is manifest, and the sole object and purpose of the tool is to scrape the paraffine from the walls.

What I claim is—

1. The within-described method of increasing the productiveness of oil-wells, consisting in enlarging the bore or diameter of the well in the oil-bearing stratum by means of a series of reciprocating or rotary expanding cutters, substantially as described.

2. The increment of the productiveness of oil-wells by the enlargement of their diameter or bore in the oil-bearing strata, by means of the starting-tool A and the finishing-tools B C, having bits or blades with cutting-surfaces on their ends and edges, so as to cut by both reciprocation and rotation, and employed in the order and manner described, all substantially as specified.

To the above specification of my invention I have signed my name this 20th day of February, A. D. 1879.

OLIVER LYMAN MATHER.

Witnesses:
   S. C. DAVIS,
   C. J. FUHES.